(12) United States Patent
Sanders et al.

(10) Patent No.: US 9,366,349 B2
(45) Date of Patent: Jun. 14, 2016

(54) SLAM SHUT SAFETY DEVICE HAVING DISC ANTI-ROTATION

(71) Applicant: EMERSON PROCESS MANAGEMENT REGULATOR TECHNOLOGIES, INC., McKinney, TX (US)

(72) Inventors: Jeffrey M. Sanders, Dallas, TX (US); Tung K. Nguyen, McKinney, TX (US); Cristian-Tiberiu Moldovan, Cluj-Napoca (RO); Roman Alexandru-Vlad, Cluj-Napoca (RO); Tiberiu Moldovan, Cluj-Napoca (RO)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 0 days.

(21) Appl. No.: 14/038,482

(22) Filed: Sep. 26, 2013

(65) Prior Publication Data
US 2014/0083515 A1    Mar. 27, 2014

Related U.S. Application Data

(60) Provisional application No. 61/706,585, filed on Sep. 27, 2012.

(51) Int. Cl.

| F16K 17/22 | (2006.01) |
|---|---|
| F16K 17/164 | (2006.01) |
| F16K 1/36 | (2006.01) |
| F16K 1/48 | (2006.01) |
| F16K 1/50 | (2006.01) |

(52) U.S. Cl.
CPC ............... *F16K 17/164* (2013.01); *F16K 1/36* (2013.01); *F16K 1/48* (2013.01); *F16K 1/487* (2013.01); *F16K 1/50* (2013.01); *Y10T 137/0379* (2015.04); *Y10T 137/7728* (2015.04)

(58) Field of Classification Search
CPC ......... F16K 17/164; F16K 17/10; F16K 1/50; F16K 1/36; Y10T 137/7728; Y10T 137/0379
USPC .................. 137/456, 463, 543.21, 543.23
See application file for complete search history.

(56) References Cited

U.S. PATENT DOCUMENTS

| 3,429,321 | A | * | 2/1969 | Thrall ............................ 137/77 |
| 8,225,812 | B2 | | 7/2012 | Faillat et al. |
| 2009/0184276 | A1 | | 7/2009 | Olberding et al. |
| 2011/0284102 | A1 | | 11/2011 | Schneider |

FOREIGN PATENT DOCUMENTS

FR          1 167 362 A       11/1958

OTHER PUBLICATIONS

Search Report for PCT/US2013/061807, mailed Dec. 11, 2013.
Written Opinion for PCT/US2013/061807, mailed Dec. 11, 2013.

* cited by examiner

*Primary Examiner* — Kevin Lee
*Assistant Examiner* — P. Macade Nichols
(74) *Attorney, Agent, or Firm* — Marshall, Gerstein & Borun LLP

(57) ABSTRACT

A slam-shut safety device includes a valve body defining a flow path, a valve disc support, and a valve disc that is mounted on the valve disc support and is movable between an open first position spaced away from the valve seat and a closed second position seated against a valve seat. A reset pin is operatively coupled to the valve disc support and is shiftable between an untripped position placing the valve disc in the open position and a tripped position placing the valve disc in the closed position. An anti-rotation assembly is carried by cooperating portions of the valve disc and the valve disc support, with the anti-rotation assembly comprising at least one protrusion and at least one receiving area sized to receive the protrusion, the anti-rotation assembly arranged to stop rotation of the valve disc relative to the valve disc support.

19 Claims, 5 Drawing Sheets

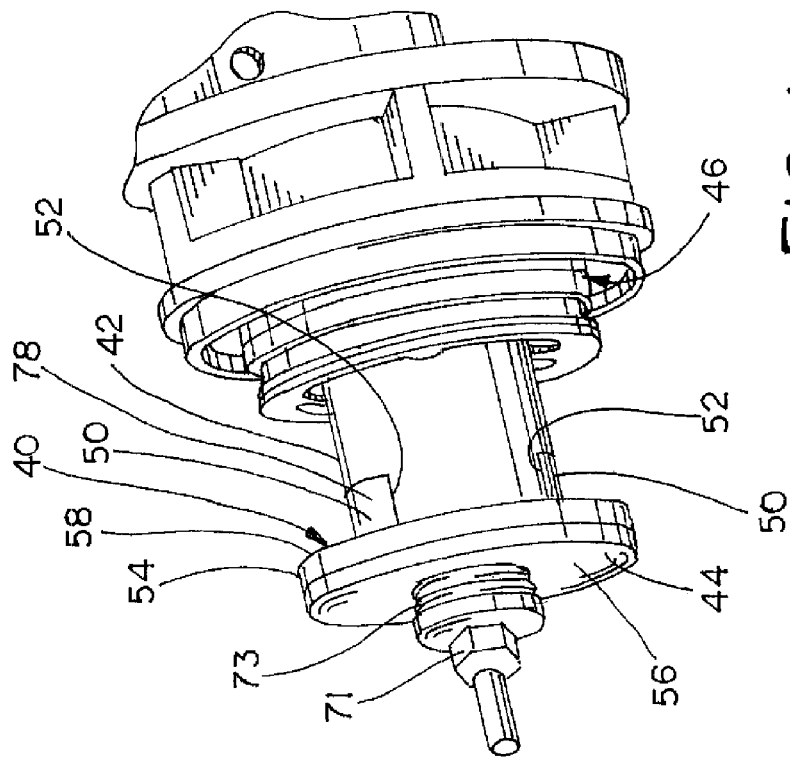
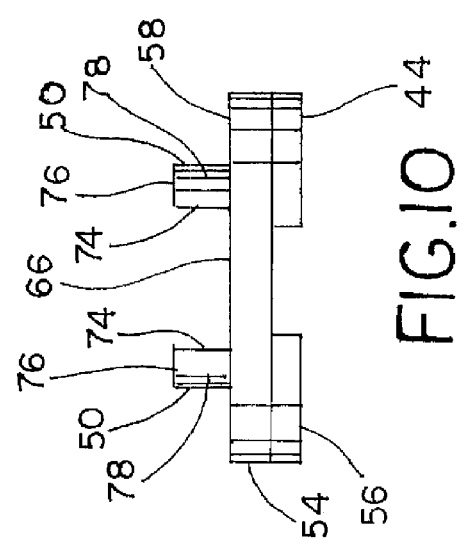
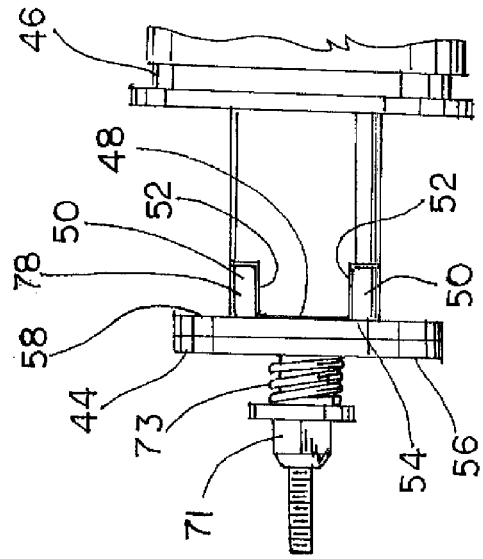

SLAM SHUT SAFETY DEVICE HAVING DISC ANTI-ROTATION

FIELD OF THE INVENTION

The present invention relates to slam-shut safety devices for gas distribution systems and, more specifically, relates to a slam-shut safety device incorporating an anti-rotation feature to secure the valve disc.

DESCRIPTION OF THE PRIOR ART

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used as the safety device to shut off flow in appropriate circumstances, such as an over pressure condition or an under pressure condition. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. A slam-shut safety valve may be disposed in the system generally upstream of the pressure regulating valve, so that the slam-shut valve may prevent gas from reaching the pressure regulating valve in the event the pressure regulating valve has failed.

Slam-shut safety valves may be positioned to monitor gas pressure adjacent to the pressure regulating valve for maximum and minimum pressure tolerances. As an example, if pressure downstream of the device exceeds either the maximum or minimum tolerance, the slam-shut safety valve closes, cutting off the flow of gas to the pressure regulating valve and preventing an uncontrolled leak of gas due to possible failure of the pressure regulating valve.

Known slam-shut safety valves have a valve disc sized to cover a valve orifice in the vicinity of a valve seat. The valve disc is coupled to a reset pin, and the reset pin in turn is attached to an actuator that senses the overpressure or underpressure condition. The reset pin is typically in the open or untripped position, which places the valve disc away from the valve seat in an open position. Should the actuator sense the appropriate trip condition, the actuator releases the reset pin, and the valve disc shifts to the closed position against the valve seat.

In conventional slam-shut devices, the valve is typically in an open position during normal operation. When the valve is in this open position, the valve disc is constantly exposed to the flow of fluid through the device. Because the valve disc is mounted on a stem, in certain flow conditions forces acting on the valve disc may cause the valve disc to rotate, which may ultimately cause premature wear on the supporting valve stem.

SUMMARY

In accordance with a first exemplary aspect, a slam-shut safety device may include a valve body having an inlet, an outlet, and defining a flow path extending between the inlet and the outlet. The valve body includes a valve seat surrounding an orifice disposed between the inlet and the outlet, a valve disc support is shiftably mounted within the valve body, and a valve disc is mounted to the valve disc support. The valve disc support and the valve disc are shiftably disposed within the valve body and movable in unison between an open first position in which the valve disc is spaced away from the valve seat, and a closed second position in which the valve disc is seated against the valve seat. A reset pin is operatively coupled to the valve disc support and is shiftable relative to the valve body between an untripped position placing the valve disc in the open first position and a tripped position placing the valve disc in the closed second position, and the reset pin is arranged to respond to an actuator to shift the reset pin from the untripped position toward the tripped position. The valve disc and the valve disc support meet along an interface, and the interface includes a protrusion and a receiving area, with the protrusion and the receiving area cooperating to prevent rotation between the valve disc and the valve disc support when the protrusion is seated adjacent the receiving area.

In accordance with a second exemplary aspect, a slam-shut safety device includes a valve body having an inlet, an outlet, and defining a flow path extending between the inlet and the outlet, with the valve body including a valve seat surrounding an orifice disposed between the inlet and the outlet. A valve disc is shiftably mounted within the valve body, and a valve disc is mounted to the valve disc support. The valve disc support and the valve disc are shiftably disposed within the valve body and are movable between an open first position in which the valve disc is spaced away from the valve seat, and a closed second position in which the valve disc is seated against the valve seat. A reset pin is operatively coupled to the valve disc support and is shiftable relative to the valve body between an untripped position placing the valve disc in the open first position and a tripped position placing the valve disc in the closed second position, with the reset pin arranged to respond to an actuator to shift the reset pin from the untripped position toward the tripped position. An anti-rotation assembly is carried by cooperating portions of the valve disc and the valve disc support, with the anti-rotation assembly comprising at least one protrusion and at least one receiving area sized to receive the protrusion. The anti-rotation assembly is arranged to stop rotation of the valve disc relative to the valve disc support.

In accordance with a third exemplary aspect, a method of stopping rotation of a valve disc in a slam-shut safety device includes providing a valve body having an inlet, an outlet, and defining a flow path extending between the inlet and the outlet, with the valve body including a valve seat surrounding an orifice disposed between the inlet and the outlet, providing a valve disc support shiftably mounted within the valve body, and mounting a valve disc to the valve disc support. The method includes shiftably disposing the valve disc support and the valve disc within the valve body to permit movement of the valve disc between an open first position in which the valve disc is spaced away from the valve seat, and a closed second position in which the valve disc is seated against the valve seat, and operatively coupling a reset pin to the valve disc support and arranging the reset pin for movement relative to the valve body between an untripped position placing the valve disc in the open first position and a tripped position placing the valve disc in the closed second position. The method includes arranging the reset pin to respond to an actuator to allow the reset pin to shift from the untripped position toward the tripped position, and providing an anti-rotation assembly carried by cooperating portions of the valve disc and the valve disc support, and providing the anti-rotation assembly with at least one protrusion and at least one receiving area sized to receive the protrusion, the anti-rotation assembly arranged to stop rotation of the valve disc relative to the valve disc support.

In further accordance with any one or more of the foregoing first, second, or third aspects, a slam-shut safety device and/or method may further include any one or more of the following preferred forms.

In one preferred form, the device includes a spring disposed within the valve body, with the spring operatively coupled to the valve disc support and arranged to bias the valve disc toward the closed second position.

In another preferred form, the protrusion is carried by the valve disc and the receiving area is carried by the valve disc support.

In another preferred form, the valve disc is mounted to a backing plate and the protrusion comprises a pair of fins extending from the backing plate, the receiving area comprises a pair of surfaces carried by the valve disc support, and the pair of fins are sized to engage the pair of surfaces. The valve disc support may include an enlarged portion, and the surfaces may be formed on the enlarged portion.

In a further preferred from, the receiving area comprises a flat surface and the protrusion comprises an arc-shaped fin having a flat surface, the flat surface of the arc-shaped fin sized to engage the flat surface of the receiving area.

In yet another preferred form, the valve disc support includes an enlarged portion, and the receiving area comprises a pair of flat surfaces formed on the enlarged portion. The protrusion comprises a pair of fins sized to engage the flat surfaces.

In another preferred from, the at least one receiving area comprises a flat surface and the at least one protrusion comprises an arc-shaped fin having a flat surface, with the flat surface of the arc-shaped fin sized to engage the flat surface of the receiving area.

In another preferred form, the valve disc support includes an enlarged portion, the receiving area comprises a pair of flat surfaces formed on the enlarged portion, and the protrusion comprises a pair of fins carried by the valve disc and sized to engage the flat surfaces.

In a preferred method form, a spring is provided and disposed within the valve body, and the spring is operatively coupled to the valve disc support to bias the valve disc toward the closed second position. The preferred from may include providing a backing plate on the valve disc and forming a pair of fins extending from the backing plate, forming the at least one receiving area from a pair of surfaces carried by the valve disc support, and sizing the pair of fins to engage the pair of surfaces. The method may include providing the valve disc support with an enlarged cylindrical portion, and forming the pair of surfaces on the enlarged portion.

In another preferred method, the steps may include forming the at least one receiving area from an arc-shaped cutout in the valve disc support, forming the at least one protrusion as an arc-shaped fin having a flat surface and extending from the valve disc, and sizing the flat surface of the arc-shaped fin to engage the flat surface of the receiving area.

BRIEF DESCRIPTION OF THE DRAWINGS

FIG. 4 is an enlarged fragmentary view in perspective of portions of the valve disc assembly illustrated in FIG. 3.

FIG. 5 is a fragmentary view in perspective of portions of the assembled valve disc assembly of FIGS. 3 and 4.

FIG. 10 is an elevational view of the valve disc and the backing plate.

DETAILED DESCRIPTION OF THE INVENTION

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

Figure 1:
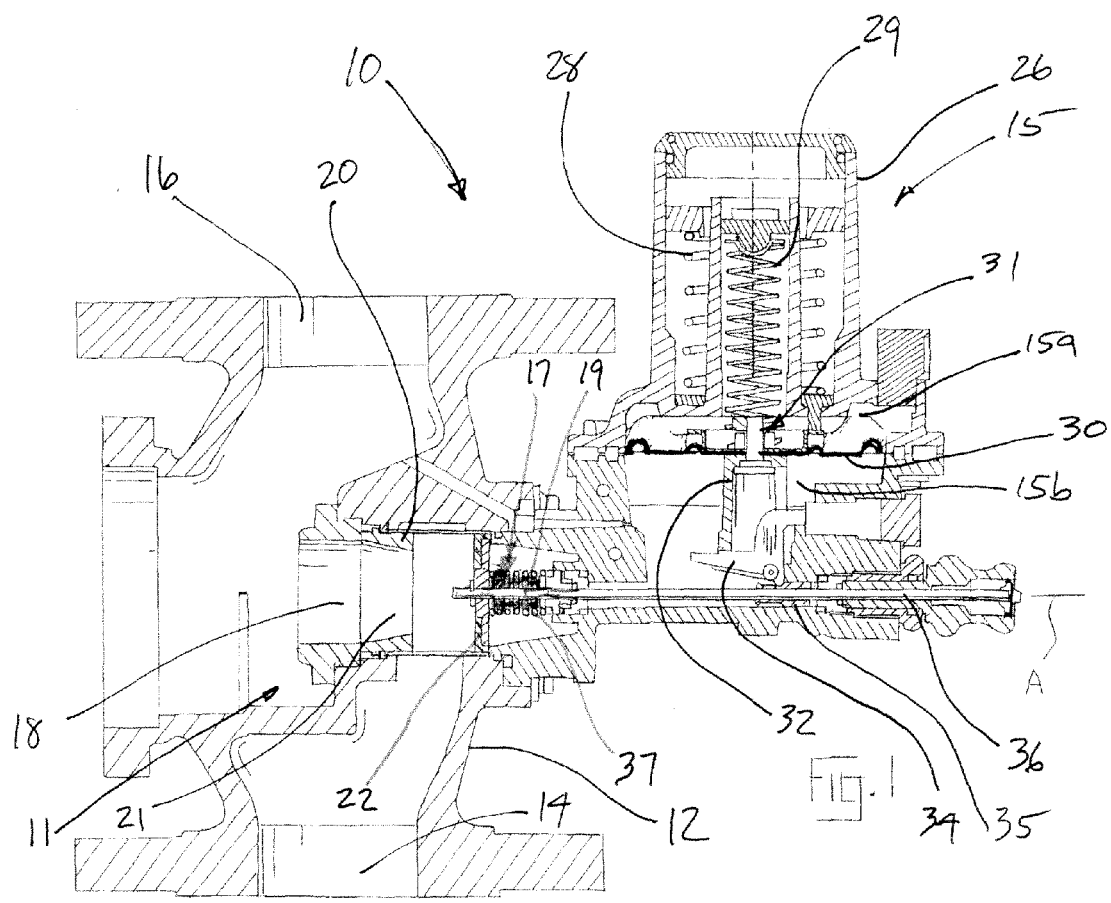
FIG. 1 is a cross-sectional view of a conventional slam shut safety module having a conventional valve disc assembly and showing the valve disc in the open position.
Figure 2:
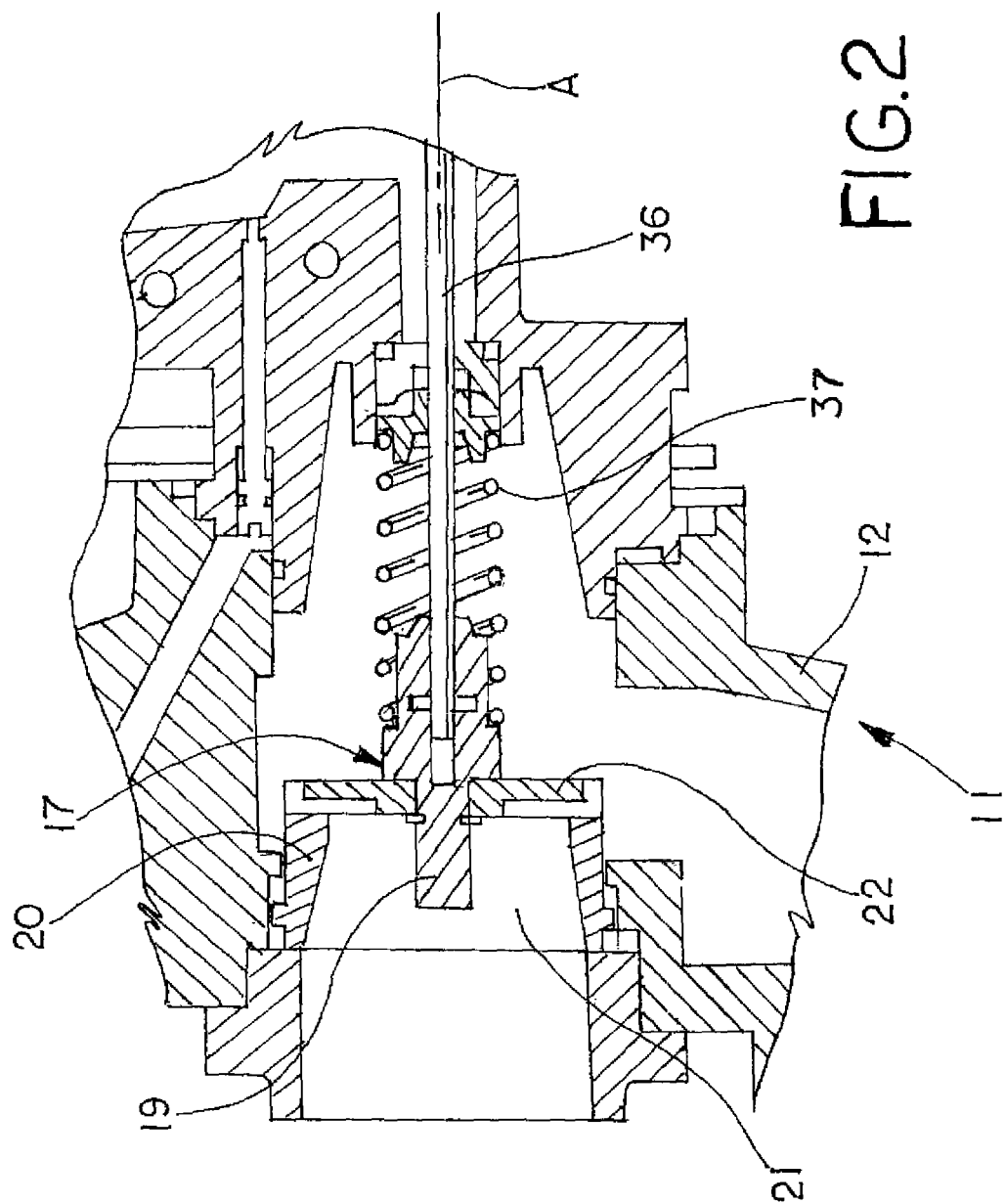
FIG. 2 is an enlarged fragmentary cross-sectional view of the conventional valve disc assembly of FIG. 1 but showing the valve disc in the closed position.

Turning now to the drawings, FIGS. 1 and 2 illustrate one example of a known slam-shut safety device 10. The slam-shut safety device 10 may be attached to a main regulator (not shown) in a gas distribution system to provide a safety shutoff capability in the event of main regulator failure. The slam-shut safety device 10 includes a valve portion 11 and an actuator 15. The valve portion 11 includes a valve body 12 having a fluid inlet 14, and a fluid outlet 16 connected by a fluid passage forming a flow path 18. A valve seat 20 is disposed within the valve body 12 and defines a flow orifice 21 forming a portion of the flow path 18. The valve portion 11 includes a valve disc assembly 17. As would be known, the valve disc assembly 17 includes a valve disc support 19 which in turn carries a valve disc 22. Consequently, when the slam shut device 10 open as shown in FIG. 1, fluid flowing through the slam-shut safety device 10 flows from the fluid inlet 14, through the flow path 18 including the valve seat 20 (and the flow orifice 21 formed by the valve seat 20) to the fluid outlet 16.

As would be known, the valve disc 22 cooperates with the valve seat 20 to restrict fluid flow through the slam-shut safety device 10 when an overpressure or underpressure condition is sensed downstream of the main regulator. The valve disc 22 slides within the valve body 12 toward the valve seat 20 in order to close the fluid orifice 21, and the valve disc 22 may be pulled away from the valve seat 20 using, for example, a reset pin of the type discussed below, in order to open the fluid orifice 21.

Typically, the actuator 15 includes a housing 26 enclosing a control spring 28 and a relief spring 29. The control spring 28 is operatively coupled to a diaphragm 30 in a known manner, while the relief spring 29 is operatively coupled to a relief valve assembly 31 in a known manner. The actuator 15 includes an upper chamber 15a and a lower chamber 15b, with the lower chamber 15b being in flow communication with the outlet 16 so as to be exposed to downstream pressure. The diaphragm 30 is sensitive to pressure changes within the lower chamber 15a of the actuator 15, and consequently the diaphragm 30 moves within the actuator housing 26 in response to pressure changes sensed via, for example, a sense tube as would be known. The diaphragm 30 is connected to or otherwise suitably operatively coupled to a back plate 32, which moves longitudinally (vertically when viewing FIG. 1) within the housing 26 in conjunction with the diaphragm 30. The back plate 32 interacts with a cam 34 to engage or release a connection ring 35 carried by a reset pin 36. The reset pin 36 is shiftable along an axis A relative to the valve body 12 between a retracted or untripped position in which the valve disc 22 is spaced away from the valve seat 20 in a first or open position opening the flow orifice 21, and a tripped position in which the valve disc 22 is seated against the valve seat 20 in a second or closed position closing the flow orifice 21. In FIG. 1, the reset pin 36 is shown in the untripped position, which corresponds to the valve disc being in the open position.

The slam-shut portion 13 includes a spring 37 or other suitable biasing mechanism, which directly or indirectly engages the valve disc 22 in order to bias the valve disc 22 toward the closed position. In the example shown, when an underpressure situation is sensed downstream, the actuator 15 moves downwardly which in turn causes the back plate 32 to rotate the cam 34 counterclockwise, thus releasing the connection ring 35 on the reset pin 36. Consequently, the spring 37 causes the reset pin 36 to shift from the untripped position shown in FIG. 1, to the tripped position of FIG. 2. When the reset pin 36 shifts to the left when viewing the Figure, the valve disc 22 also slides toward the valve seat 20, ultimately bringing the valve disc 22 into contact with the valve seat 20, thus closing the flow orifice 21 and shutting off fluid flow through the flow path 18. FIG. 2 illustrates a close up view of the valve disc 22 in the closed position after the reset pin 36 has been released by the actuator 15. The valve disc 22 is seated against the valve seat 20, thus closing the slam-shut safety device 10 and preventing fluid flow along the flow path 18.

Figure 3:
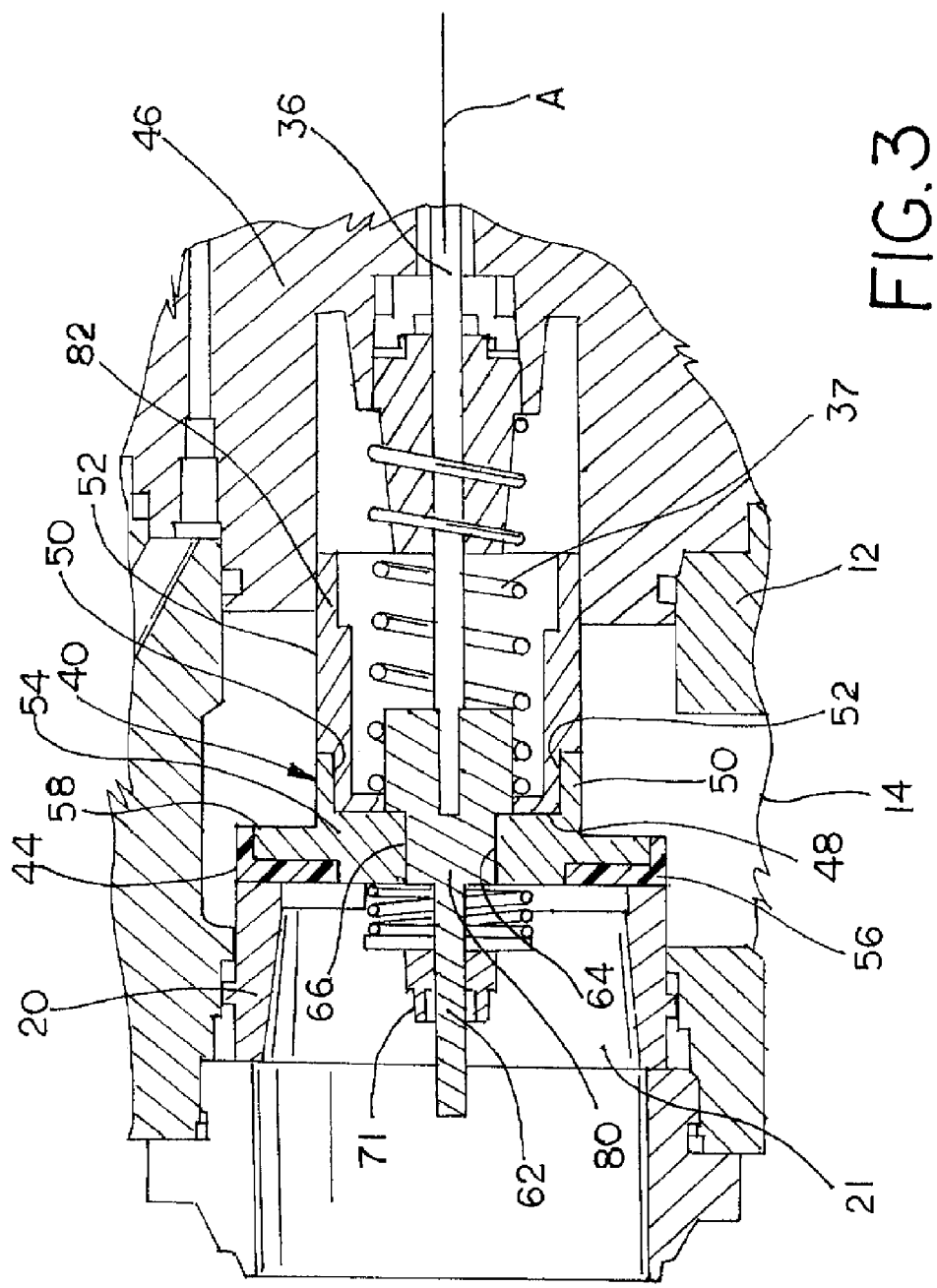
FIG. 3 is an enlarged fragmentary cross-sectional view of a valve disc assembly assembled in accordance with the teachings of a disclosed example of the present invention and illustrating the valve disc in the closed position.

Referring now to the drawings, FIGS. 3, 4 and 5 illustrate an anti-rotation valve disc assembly 40 assembled in accordance with the teachings of the present invention. Those of skill in the art will understand that, upon reading the present disclosure, the valve disc assembly 40 may be mounted within the slam-shut device 10 discussed above, thus replacing the valve disc assembly 19 discussed above. Otherwise, the slam-shut safety device 10 may include the same or similar components and, for the sake of convenience, these same or similar components will retain their same reference numerals. Consequently, the slam-shut safety device 10 still includes the valve body 12 having the inlet 14, the outlet 16, and defining the flow path 18 extending between the inlet 16 and the outlet 18. Further, the valve body 12 includes the valve seat 20 surrounding the orifice 21 disposed between the inlet 14 and the outlet 16. The valve disc assembly 40 includes a valve disc support 42, and a valve disc 44 is attached to the valve disc support 42. The valve disc support 42 is shiftably mounted within the valve body 12. In the example shown, the valve disc support 42 is slidably mounted within a guide 46, and in turn the guide 46 is mounted within the valve body 12 in any suitable manner. Consequently, the valve disc 44 is shiftable relative to the surrounding valve body 12. In the example shown, the valve disc support 42 and the valve disc 44 are shiftable within the valve body 12 and together move in unison between an open first position in which the valve disc 44 is spaced away from the valve seat 20, and a closed second position in which the valve disc 44 is seated against the valve seat 20. While FIG. 3 illustrates the valve disc 44 in the closed position, those of skill in the relevant art will understand that when the valve disc 44 is shifted to the open position (by moving the valve disc 44 to the right along axis A when viewing FIG. 3), the valve disc 44 will be spaced away from the valve seat 20 in a manner similar to that shown in FIG. 1 with respect to the prior art).

The reset pin 36 is operatively coupled to the valve disc support 42 in a known manner and is preferably shiftable relative to the valve body 12 between an untripped position (similar to that shown in FIG. 1) placing the valve disc in the open first position, and a tripped position as (shown in FIG. 3) placing the valve disc 44 in the closed second position. As with the prior art slam-shut device of FIGS. 1 and 2, the reset pin 36 is arranged to respond to the actuator 15 in order to shift the reset pin 36 from the untripped position toward the tripped position under the force of the spring 37.

As shown in FIG. 3, the spring 37 is positioned to apply a biasing force to the valve disc 44 in order to urge the valve disc 44 toward the closed position in a manner similar to that shown in the prior art arrangement. In the example shown, the spring 37 bears against the valve disc support 42. The spring 37 may be operatively coupled to the valve disc 44 in any suitable manner, either directly or indirectly.

As best shown in FIGS. 3 and 5, the valve disc 44 and the valve disc support 42 meet along an interface 48. In accordance with the disclosed example, the anti-rotation valve disc assembly 40 includes one or more protrusions and one or more receiving areas which engage one another adjacent the interface 48. The protrusions and the receiving areas cooperate to prevent rotation, or to prevent continued rotation, between the valve disc 44 and the valve disc support 42 when the protrusion or protrusions is/are seated adjacent the receiving area(s). In the example shown, the anti-rotation valve disc assembly 40 includes two protrusions 50, while the valve disc support 42 includes a pair of receiving areas 52.

In the example shown in FIGS. 3, 4 and 5, the protrusions 50 are carried by the valve disc 44, while the receiving areas are carried by the valve disc support 42. Preferably, the valve disc 44 includes a backing plate 54, and the valve disc 44 is in the form of a seal ring 56, with the seal ring 56 and a backing plate 54 joined to one another in any suitable manner as would be known. As shown, the protrusions 50 are formed integrally with or otherwise carried by the backing plate 54, such that the protrusions extend away from a back surface 58 of the backing plate 54 in a direction generally parallel to the axis A.

Figure 6:
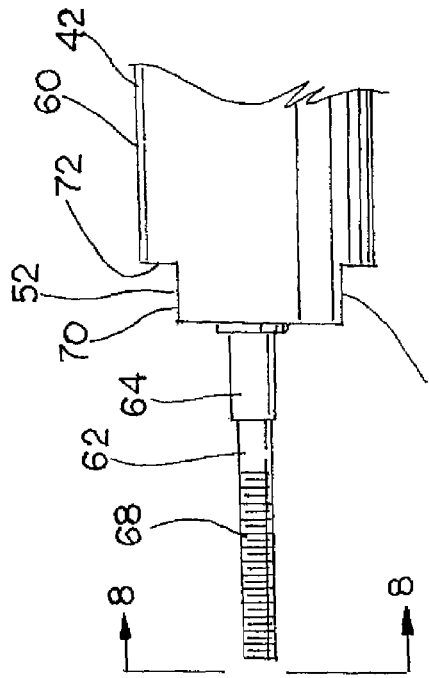
FIG. 6 is an enlarged view in perspective of the disc support.
Figure 7:
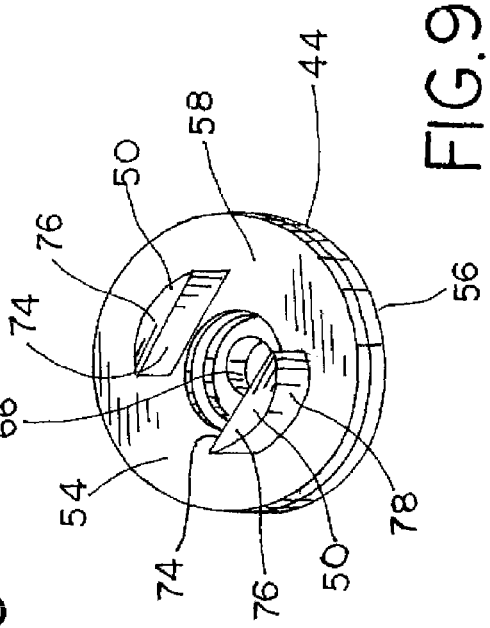
FIG. 7 is an elevational view of the disc support.
Figure 8:
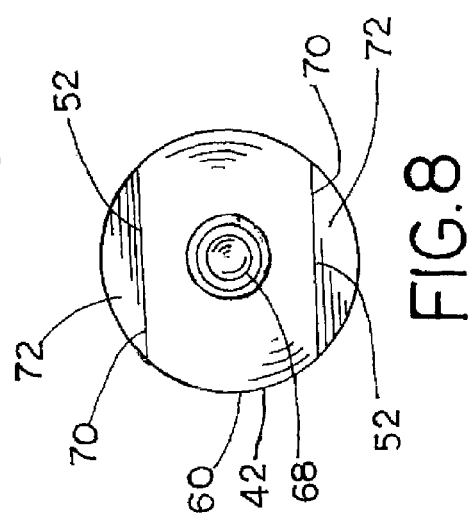
FIG. 8 is an end view of the disc support taken along line 8-8 of FIG. 7.

Referring now to FIGS. 6 through 8, the valve disc support 42 is shown in greater detail. The valve disc support 42 includes an enlarged portion 60 and a stem 62 having a receiving area 64 sized to fit through a corresponding aperture 66 in the valve disc 44 (the aperture 66 to the valve disc 44 is visible in FIGS. 3, 9 and 10). In the example shown, the stem 62 includes threads 68 to allow the valve disc 44 to be secured to the stem 62 using a threaded nut (such as the threaded nut 71 illustrated in FIGS. 3, 4 and 5). Alternatively, the stem 62 may be arranged to allow the valve disc 44 to be attached to the stem 62 using, for example, a mounting clip or any other suitable mounting arrangement. In the example shown, the receiving areas 52 include a first surface 70 extending generally parallel to the axis A, and an end surface 72 which, in the disclosed example, is oriented substantially perpendicular to the first surface 70. As shown to advantage in FIGS. 6 and 8, the surfaces 70 and 72 are sized and arranged such that the receiving areas 52 take the form of a generally arc-shaped cutout in the enlarged portion 60 of the valve disc support 42.

Figure 9:
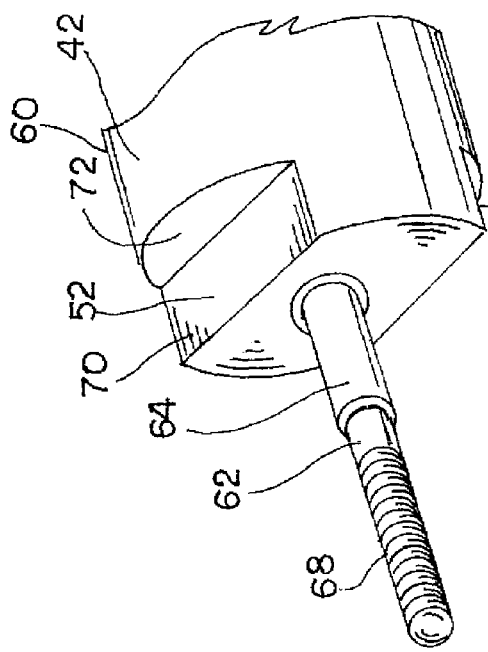
FIG. 9 is a perspective view of the valve disc and illustrating the back side of the valve disc backing plate.

Referring now to FIGS. 9 and 10, the protrusions 50 carried by the valve disc 44 include a first surface 74 extending facing inwardly and extending laterally generally parallel to a chord of the circular valve disc 44, and a second and planar end surface 76. Further, the protrusions include a curved outer surface 78. The surfaces 74, 76 and 78 are sized and arranged such that the protrusions 50 take the form of generally arc-shaped fins extending from the back surface 58 of the backing plate 54.

Those of skill in the art, upon reading the present disclosure, will readily understand that the protrusions/receiving areas may take a variety of shapes and/or forms in order to prevent or limit rotation between the valve disc 44 and the valve disc support 42.

When assembled as shown in FIGS. 4 and 5, the surfaces 74 of the protrusions 50 are seated adjacent or otherwise in suitable engagement with the surfaces 70 of the receiving areas 52, while the surfaces 76 on the protrusions 50 are seated adjacent or otherwise in suitable engagement with the surfaces 72 of the receiving areas 52. Also, in accordance with the disclosed example, the surfaces 78 are sized and shaped to correspond to a generally cylindrical outer surface of the enlarged portion 60 of the disc support 42. With reference to FIGS. 3 and 4, the protrusions 50 are sized and shaped to slide within the housing 46 when the valve disc support 42 shifts relative to the surrounding housing 46. Consequently, the valve disc assembly 40 may be retrofitted onto an existing slam-shut device with minimal modifications. For example, one may form the receiving areas 52 in an existing disc support by making suitable cuts in the existing disc support.

Referring again to FIG. 3, the valve disc support 42 may formed from an inner piece 80 and an outer piece 82. As shown, the outer piece 82 includes an internal bore 84 sized to receive the inner piece 80 as well as a forward portion of the spring 37. The outer piece 82 includes a bore 83 sized to allow the inner piece 80 to extend through the outer piece 82, such that the stem 62 is positioned to receive the valve disc 44 on the receiving area 64. In the example shown, the reset pin 36 is affixed to the inner piece 80, such as by threading the reset pin into a threaded bore formed in the inner piece 80, and suitably securing the reset pin 36 to the inner piece 80 using a locknut. Other forms of connecting the reset pin 36 to the valve disc support 42 and/or to the inner piece 80 may prove suitable.

Referring now to FIGS. 3, 4 and 5, the valve disc 44 may be attached to the disc support 42 using a spring loaded assembly 73 in place of the lock nut 71. Further details of the spring loaded assembly 73 may be found in co-pending and commonly assigned U.S. patent application Ser. No. 14/038,453, the entire disclosure of which is incorporated by reference herein.

When assembled in accordance with an exemplary form or forms outlined herein, the resulting slam-shut device may experience one or more of the following advantages with respect to prior art devices. The valve disc assembly 40, with the provision of the anti-rotation features outlined herein or equivalents thereof, prevents and/or limits rotation of the valve disc 44 with respect to the disc support 42. Prior art mounting arrangements, under certain flow and/or pressure conditions, may allow the valve disc to rotate about the axis A. Such rotation causes wear or other damage to the stem of the disc support. Consequently, the present valve disc assembly 40 avoids where of the disc support and extends the service life of the resulting slam-shut device.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A slam-shut safety device having an anti-rotation assembly, the slam-shut safety device comprising:
    a valve body, the valve body having an inlet, an outlet, and defining a flow path extending between the inlet and the outlet, the valve body including a valve seat surrounding an orifice disposed between the inlet and the outlet;
    a valve disc support shiftably mounted within the valve body;
    a valve disc mounted to the valve disc support;
    the valve disc support and the valve disc shiftably disposed within the valve body and movable in unison between an open first position in which the valve disc is spaced away from the valve seat, and a closed second position in which the valve disc is seated against the valve seat;
    a reset pin operatively coupled to the valve disc support and shiftable relative to the valve body between an untripped position placing the valve disc in the open first position and a tripped position placing the valve disc in the closed second position, the reset pin arranged to respond to an actuator to shift the reset pin from the untripped position toward the tripped position;
    the valve disc and the valve disc support meeting along an interface, the interface comprising a protrusion and a receiving area, the protrusion and the receiving area cooperating to prevent rotation between the valve disc and the valve disc support when the protrusion is seated adjacent the receiving area; and
    wherein the protrusion extends in a direction parallel to the reset pin.

2. The slam-shut safety device of claim 1, including a spring disposed within the valve body, the spring operatively coupled to the valve disc support and arranged to bias the valve disc toward the closed second position.

3. The slam-shut safety device of claim 2, wherein the protrusion is carried by the valve disc and the receiving area is carried by the valve disc support.

4. The slam-shut safety device of claim 3, wherein the valve disc is mounted to a backing plate and the protrusion comprises a pair of fins extending from the backing plate, the receiving area comprising a pair of surfaces carried by the valve disc support, and wherein the pair of fins are sized to engage the pair of surfaces.

5. The slam-shut device of claim 4, wherein the valve disc support includes an enlarged portion, and wherein the surfaces are formed on the enlarged portion.

6. The slam-shut device of claim 2, wherein the receiving area comprises a flat surface and the protrusion comprises an arc-shaped fin having a flat surface, the flat surface of the arc-shaped fin sized to engage the flat surface of the receiving area.

7. The slam-shut device of claim 2, wherein the valve disc support includes an enlarged portion, and wherein the receiving area comprises a pair of flat surfaces formed on the enlarged portion, and further wherein the protrusion comprises a pair of fins sized to engage the flat surfaces.

8. The slam-shut safety device of claim 1, wherein the receiving area is an arc-shaped cutout carried by the valve disc support.

9. A slam-shut safety device, comprising:
    a valve body, the valve body having an inlet, an outlet, and defining a flow path extending between the inlet and the outlet, the valve body including a valve seat surrounding an orifice disposed between the inlet and the outlet;

a valve disc support shiftably mounted within the valve body;

a valve disc mounted to the valve disc support;

the valve disc support and the valve disc shiftably disposed within the valve body and movable between an open first position in which the valve disc is spaced away from the valve seat, and a closed second position in which the valve disc is seated against the valve seat;

a reset pin operatively coupled to the valve disc support and shiftable relative to the valve body between an untripped position placing the valve disc in the open first position and a tripped position placing the valve disc in the closed second position, the reset pin arranged to respond to an actuator to shift the reset pin from the untripped position toward the tripped position;

an anti-rotation assembly carried by cooperating portions of the valve disc and the valve disc support, the anti-rotation assembly comprising at least one protrusion and at least one receiving area sized to receive the protrusion, the anti-rotation assembly arranged to stop rotation of the valve disc relative to the valve disc support; and wherein the valve disc is mounted to a backing plate and the at least one protrusion is formed integrally with the backing plate.

10. The slam-shut safety device of claim 9, including a spring disposed within the valve body, the spring operatively coupled to the valve disc support and arranged to bias the valve disc toward the closed second position.

11. The slam-shut safety device of claim 9, wherein the at least one protrusion comprises a pair of fins extending from the backing plate, wherein the at least one receiving area comprises a pair of surfaces carried by the valve disc support, and wherein the pair of fins are sized to engage the pair of surfaces.

12. The slam-shut device of claim 11, wherein the valve disc support includes an enlarged portion, and wherein the surfaces are formed on the enlarged portion.

13. The slam-shut device of claim 9, wherein the at least one receiving area comprises a flat surface and the at least one protrusion comprises an arc-shaped fin having a flat surface, the flat surface of the arc-shaped fin sized to engage the flat surface of the receiving area.

14. The slam-shut device of claim 9, wherein the valve disc support includes an enlarged portion, wherein the receiving area comprises a pair of flat surfaces formed on the enlarged portion, and further wherein the protrusion comprises a pair of fins carried by the valve disc and sized to engage the flat surfaces.

15. A method of stopping rotation of a valve disc in a slam-shut safety device, the method comprising:

Providing a valve body having an inlet, an outlet, and defining a flow path extending between the inlet and the outlet, the valve body including a valve seat surrounding an orifice disposed between the inlet and the outlet;

providing a valve disc support shiftably mounted within the valve body;

mounting a valve disc to the valve disc support;

shiftably disposing the valve disc support and the valve disc within the valve body to permit movement of the valve disc between an open first position in which the valve disc is spaced away from the valve seat, and a closed second position in which the valve disc is seated against the valve seat;

operatively coupling a reset pin to the valve disc support and arranging the reset pin for movement relative to the valve body between an untripped position placing the valve disc in the open first position and a tripped position placing the valve disc in the closed second position;

arranging the reset pin to respond to an actuator to allow the reset pin to shift from the untripped position toward the tripped position;

providing an anti-rotation assembly carried by cooperating portions of the valve disc and the valve disc support;

providing the anti-rotation assembly with at least one protrusion and at least one receiving area sized to receive the protrusion, the anti-rotation assembly arranged to stop rotation of the valve disc relative to the valve disc support; and providing a spring at least partially disposed within the valve disc support, and operatively coupling the spring to the valve disc to bias the valve disc toward the closed second position.

16. A method of stopping rotation of a valve disc in a slam-shut safety device, the method comprising:

Providing a valve body having an inlet, an outlet, and defining a flow path extending between the inlet and the outlet, the valve body including a valve seat surrounding an orifice disposed between the inlet and the outlet;

providing a valve disc support shiftably mounted within the valve body;

mounting a valve disc to the valve disc support;

shiftably disposing the valve disc support and the valve disc within the valve body to permit movement of the valve disc between an open first position in which the valve disc is spaced away from the valve seat, and a closed second position in which the valve disc is seated against the valve seat;

operatively coupling a reset pin to the valve disc support and arranging the reset pin for movement relative to the valve body between an untripped position placing the valve disc in the open first position and a tripped position placing the valve disc in the closed second position;

arranging the reset pin to respond to an actuator to allow the reset pin to shift from the untripped position toward the tripped position;

providing an anti-rotation assembly carried by cooperating portions of the valve disc and the valve disc support;

providing the anti-rotation assembly with at least one protrusion and at least one receiving area sized to receive the protrusion, the anti-rotation assembly arranged to stop rotation of the valve disc relative to the valve disc support; and providing a backing plate on the valve disc and forming a pair of fins extending from the backing plate, and forming the at least one receiving area from a pair of surfaces carried by the valve disc support, and sizing the pair of fins to engage the pair of surfaces.

17. The method of claim 16, including providing the valve disc support with an enlarged cylindrical portion, and forming the pair of surfaces on the enlarged portion.

18. The method of claim 16, including forming the at least one receiving area from an arc-shaped cutout in the valve disc support, and forming the at least one protrusion as an arc-shaped fin having a flat surface and extending from the valve disc, and sizing the flat surface of the arc-shaped fin to engage the flat surface of the receiving area.

19. A method of stopping rotation of a valve disc in a slam-shut safety device, the method comprising:

Providing a valve body having an inlet, an outlet, and defining a flow path extending between the inlet and the outlet, the valve body including a valve seat surrounding an orifice disposed between the inlet and the outlet;

providing a valve disc support shiftably mounted within the valve body;

mounting a valve disc to the valve disc support;

shiftably disposing the valve disc support and the valve disc within the valve body to permit movement of the valve disc between an open first position in which the valve disc is spaced away from the valve seat, and a closed second position in which the valve disc is seated against the valve seat;

operatively coupling a reset pin to the valve disc support and arranging the reset pin for movement relative to the valve body between an untripped position placing the valve disc in the open first position and a tripped position placing the valve disc in the closed second position;

arranging the reset pin to respond to an actuator to allow the reset pin to shift from the untripped position toward the tripped position; and providing an anti-rotation assembly carried by cooperating portions of the valve disc and the valve disc support;

providing the anti-rotation assembly with at least one protrusion and at least one receiving area sized to receive the protrusion, the anti-rotation assembly arranged to stop rotation of the valve disc relative to the valve disc support;

providing a spring disposed within the valve body, and operatively coupling the spring to the valve disc support to bias the valve disc toward the closed second position;

providing a backing plate on the valve disc and forming a pair of fins extending from the backing plate, and forming the at least one receiving area from a pair of surfaces carried by the valve disc support, and sizing the pair of fins to engage the pair of surfaces; and forming the at least one receiving area from an arc-shaped cutout in the valve disc support, and forming the at least one protrusion as an arc-shaped fin having a flat surface and extending from the valve disc, and sizing the flat surface of the arc-shaped fin to engage the flat surface of the receiving area.

\* \* \* \* \*